(12) United States Patent
Ulens et al.

(10) Patent No.: US 9,823,666 B2
(45) Date of Patent: Nov. 21, 2017

(54) FLOW CONTROL SYSTEM

(75) Inventors: Jan Ulens, Tremelo (BE); Philip Vandenheuvel, Hofstade (BE); Peter Vandendriessche, Nieuwrode (BE)

(73) Assignee: Belparts, Rotselaar (BE)

( * ) Notice: Subject to any disclaimer, the term of this patent is extended or adjusted under 35 U.S.C. 154(b) by 515 days.

(21) Appl. No.: 13/001,558

(22) PCT Filed: Dec. 22, 2008

(86) PCT No.: PCT/EP2008/068188
§ 371 (c)(1),
(2), (4) Date: Mar. 24, 2011

(87) PCT Pub. No.: WO2009/156010
PCT Pub. Date: Dec. 30, 2009

(65) Prior Publication Data
US 2011/0162742 A1 Jul. 7, 2011

(30) Foreign Application Priority Data
Jun. 26, 2008 (BE) .................................. 2008/0354

(51) Int. Cl.
*G05D 7/06* (2006.01)
*F24D 19/10* (2006.01)

(52) U.S. Cl.
CPC ....... *G05D 7/0635* (2013.01); *F24D 19/1015* (2013.01); *F24D 19/1024* (2013.01); *F24D 2220/044* (2013.01); *Y10T 137/86485* (2015.04)

(58) Field of Classification Search
CPC ............. F24D 19/1015; G05D 7/0635; Y10T 137/87265–137/87563; Y10T 137/877–137/87909
(Continued)

(56) References Cited

U.S. PATENT DOCUMENTS 3,556,126 A * 1/1971 Oswald .................... 137/118.04
5,052,230 A * 10/1991 Lang et al. ................ 73/861.28
(Continued)

FOREIGN PATENT DOCUMENTS

DE       3432494       3/1986
DE       3432494 A1    3/1986
(Continued)

OTHER PUBLICATIONS

VDMA-Einheitsblatt 24199 (Stand Mai 2005) "Regelungstechnische Anforderungen an die Hydraulik bei Planung und Ausführung von Heizungs-, Kälte, Trinkwarmwasser- und Raumlufttechischen Anlagen", free translated as follows: Association for German Machine- and System Construction (VDMA), Consensus paper 24199 (Status May 2005): Control Ssystem recommendations for the Hydraulics with the Design and Implementation of technical installations for Heating, Cooling, Hot Tap Water and Inside Air.
(Continued)

*Primary Examiner* — William McCalister
(74) *Attorney, Agent, or Firm* — NLO N.V.; Catherine A. Shultz; Minerva Rivero (57) ABSTRACT

The present invention relates to a flow control system for controlling a flow of a medium passing through a pipe part of a pipe system via which the medium is distributed from a common source to a plurality of consumer devices. The flow control system comprises a flow sensor for sensing an actual medium flow through the pipe part, a controller in communicative connection with the flow sensor and provided for evaluating the electrical signal indicative of the sensed actual medium flow with a value representing a set medium flow and an orifice adjusting system in communicative connection with the controller and provided for adjusting the adjustable orifice in response to the control (Continued)

signal received from the controller. The flow sensor is arranged outside the flow chamber and has a static measurement principle based on a wave propagating in the medium.

30 Claims, 9 Drawing Sheets (58) Field of Classification Search
USPC ............. 137/10, 486, 487.5, 861–887, 137/599.01–601.21
See application file for complete search history.

(56) References Cited

U.S. PATENT DOCUMENTS

| | | | |
|---|---|---|---|
| 5,586,449 A * | 12/1996 | Krist | G05D 23/1919 165/288 |
| 5,904,292 A * | 5/1999 | McIntosh | G05D 23/1393 165/295 |
| 5,927,321 A * | 7/1999 | Bergamini | 137/487.5 |
| 5,927,400 A * | 7/1999 | Bononi | G01F 1/10 137/499 |
| 6,418,954 B1 * | 7/2002 | Taylor et al. | 137/9 |
| 6,532,978 B1 * | 3/2003 | Muller-Kuhrt et al. | 137/1 |
| 6,820,632 B2 * | 11/2004 | Ohmi et al. | 137/14 |
| 6,941,821 B2 * | 9/2005 | Umekage et al. | 73/861.27 |
| 6,941,965 B2 * | 9/2005 | Lull et al. | 137/9 |
| 6,988,418 B2 * | 1/2006 | Koudal et al. | 73/861.22 |
| 6,993,445 B2 * | 1/2006 | Clarke et al. | 702/106 |
| 7,007,707 B2 * | 3/2006 | Ambrosina et al. | 137/9 |
| 7,143,774 B2 * | 12/2006 | Lull et al. | 137/9 |
| 2002/0040733 A1 | 4/2002 | Balazy et al. | |
| 2008/0029174 A1 | 2/2008 | Yoshino | |
| 2011/0162742 A1 | 7/2011 | Ulens et al. | |
| 2015/0088321 A1 | 3/2015 | Schmidt et al. | |
| 2015/0176931 A1 | 6/2015 | Aeberhard et al. | |

FOREIGN PATENT DOCUMENTS

| | | |
|---|---|---|
| DE | 102006028178 A1 | 12/2007 |
| EP | 2157376 | 2/2010 |
| WO | 9825086 | 6/1998 |
| WO | 0005711 | 9/2000 |
| WO | 0057111 A1 | 9/2000 |
| WO | 0113017 | 2/2001 |
| WO | 2006136158 | 12/2006 |
| WO | 2008/039065 A1 | 4/2008 |
| WO | 2008039065 | 4/2008 |
| WO | 2010/074921 | 7/2010 |
| WO | 2010074921 | 7/2010 |
| WO | 2014183868 | 11/2014 |

OTHER PUBLICATIONS

Association for German Machine- and System Construction (VDMA), Consensus paper 24199 (Status May 2005): Control Ssstem recommendations for the Hydraulics with the Design and Implementation of technical installations for Heating, Cooling, Hot Tap Water and Inside Air.
Tränkler, Pocket book of the Measurement Technique. 3rd Edition, Oldenbourg, Vienna 1992.
Niebuhr et al., "Physical Measurement Technique with Sensors", 4th Edition, Oldenbourg, Vienna, 1996.
Opposition dated Jul. 3, 2014 in corresponding European Patent EP 2307938B1.
VDMA-Einheitsblatt, "VDMA-Einhaitsblatt 2419—Regelunstechnische Anforderungen an die Hydraulik bei Plandung und Ausfuhrung von Heizungs-Kalte, Trinkwarmwasser- und Raumluftrechnischen Anlagen" VDMA-Einheitsblatt, Mai 20058.
Trankler, Hans-Rolf, "Taschenbuch der Messtechnik," Munchen: R. Oldenbourg Verlang GmbH, 1996, Ed. 4, Auflage ISBN: 3-486-23614-8.
Niebuhr et al. "Physikalische Messtechnik mit Sensoren" Munchen: R. Oldenbourg Verlag, GmbH, 1996, Ed. 4. Auflage ISBN: 3-486-23614-8.
Sipahi et al. Stability and Stabilization of Systems with Time Delay, IEEE Control Systems, IEEE, USA, vol. 31, No. 1, Feb. 1, 2011, p. 38-65, XP011372720.

* cited by examiner

FLOW CONTROL SYSTEM

CROSS REFERENCE TO RELATED APPLICATIONS

This application is a National Stage of International Application No. PCT/EP2008/068188 filed Dec. 22, 2008, which claims priority from Belgium Patent Application No. 2008/0354 filed Jun. 26, 2008, the contents of all of which are incorporated herein by reference in their entirety.

The present invention relates to a flow control system for controlling a flow of a medium passing through a pipe part of a pipe system via which the medium is distributed from a common source to a plurality of consumer devices, according to the preamble of claim 1.

In residential, and in particular in non-residential buildings, several applications are known which make use of a pipe system that distributes a medium from a common source to a number of consumer devices spread over the building. Such a pipe system may be a closed circuit, comprising a number of supply pipes connecting the common source with each of the consumer devices and a number of return pipes connecting each of the consumer devices back to the common source. This is for instance the case where the consumer devices are heat exchange systems. The pipe system may also be an open circuit, comprising a number of supply pipes connecting the common source with each of the consumer devices only, without return pipes connecting each of the consumer devices back to the common source. This is for instance the case in sanitary applications. Such a pipe system may also be a combination of a closed circuit and an open circuit. This is for instance the case when heating water is delivered from a common source to a number of heat exchangers, which are provided to heat up the rooms in the building, and to a number of water taps, which are provided to deliver heated water to the consumer.

In such systems it is known to include control valves with an adjustable orifice for controlling the flow of medium to the respective consumer device. The position of the orifice determines the amount of medium passing through the consumer device per time unit. In heat exchange applications this means that the position of the orifice determines the amount of heat delivered from the heat exchanger to the room. However, the amount of medium passing through the consumer device is not only determined by the position of the orifice, but also by the pressure at which the medium is passed through the consumer device as well as by other influencing factors. This pressure differs depending on for example the distance between the common source and the consumer device. This is in particular the case in non-residential buildings, where the pipe system and the consumer devices are in most cases divided over a plurality of different floors in the building. The pressure at a specific consumer device may even vary over time, for instance as a result of closing or opening a valve in a pipe to one or more other consumer devices. In heat exchange applications, the closing of such a valve may lead to an increase of the pressure of the medium flowing to one or more of the other heat exchangers in the circuit and hence to a higher flow rate towards these heat exchangers and to an increase of the amount of energy/heat delivered by the heat exchangers to the respective room. This is not desired.

Several systems were already developed to attempt to provide in a pressure independent control of the medium flow through a pipe system.

WO-A-9206422 is for instance related to a system for automatically adjusting the medium flow to a set medium flow, independent of pressure variations between the entrance and exit of the heat exchanger. To this end the control system comprises a first medium flow control unit, set to a predetermined value, and a second medium flow control unit, that allows to create a variable pressure loss. The control system further comprises a mechanic drive mechanism for automatically compensating each detected variation of pressure loss between the entrance and exit of the heat exchanger by more or less closing the second flow medium flow control unit. The pressure difference between entrance and exit, and thus the set medium flow, is only set once. The control system has the disadvantage that only minor medium flow variations can be compensated, restricting the applicability range of the system.

Another type of control system for pipe systems is known from U.S. Pat. No. 6,435,207. U.S. Pat. No. 6,435,207 describes a flow regulation control valve for setting and measuring volume flows in pipes. The flow regulation control valve comprises a shut-off member arranged in a flow chamber, for setting a desired flow state and a sensor arranged in or adjacent the flow chamber, for sensing a value representative of a flow through the flow chamber. The flow regulation control valve further comprises an evaluation unit which determines the flow from the value measured by the sensor and from the characteristic values of the section control valve which are stored in an electronic data store at the sensor. These characteristic values are valve specific. The adjustment of the flow through a section of the pipe system is done by manually adjusting the shut-off member of the flow regulation control valve until the desired flow is displayed in the evaluation unit. Such a control system has the disadvantage that the characteristic values of the housing are used to determine the actual flow rate. The characteristic values or characteristic curve of a control valve gives the correct relationship between the medium flow and the position of the control valve only at constant pressure. The system can be calibrated for use at a given nominal pressure, as a result of requiring the characteristic values of the control valve, only a narrow range of pressure variations can be accurately compensated for.

U.S. Pat. No. 5,927,400 discloses a flow control system for controlling flow to a heat exchanger. The system comprises a turbine type flow sensor in which a turbine is driven by the flowing medium. The number of revolutions per time unit of the turbine is counted to measure the flow rate of the medium at the turbine. The sensor outputs a pulse signal created by magnets on the turbine, so the number of pulses per time unit is a measure for the flow rate. An evaluation unit, using preset characteristics depending on the flow range, compares the measured flow rate with a set flow rate, which is derived from a temperature setting, and operates a valve accordingly. The system has the disadvantage that its accuracy is poor, especially at low flow rates, again restricting the applicability range of the system.

It is therefore an object of the present invention to provide a widely applicable, pressure independent flow control system with accurate control of the flow rate over the whole of the applicability range.

This is achieved according to the present invention with a flow control system showing the technical features of the first claim.

As used herein, with the term "medium" is meant any liquid, gas, smoke, aerosol, flowing solid or any mixture thereof or any other flowing medium known to the person skilled in the art.

As used herein, "in front of device A" or "behind device A" respectively means "in front of device A, taken in flow direction of the medium" and "behind device A, taken in flow direction of the medium".

As used herein, with the term "heat exchange" is meant provided for heating and/or cooling.

As used herein, with the term "consumer device" is intended any device which either consumes energy supplied via the medium or consumes the medium itself, including, but not being limited to a heat exchanger (heating and/or cooling) or a water tap.

The flow control system of the invention comprises:
a flow sensor for sensing an actual medium flow through the pipe part and outputting an electrical signal indicative of the sensed actual medium flow,
a controller in communicative connection with the flow sensor, the controller being provided for evaluating the electrical signal indicative of the sensed actual medium flow with a value representing a set medium flow and outputting a control signal based on the evaluation, and
an orifice adjusting system in communicative connection with the controller, the orifice adjusting system comprising a flow chamber with an adjustable orifice in the pipe part, the orifice adjusting system being provided for adjusting the adjustable orifice in response to the control signal of the controller.

The value representing the set medium flow can be a desired flow value or a setting from which a desired flow value is derived, such as for example a desired room temperature setting.

According to the invention, the flow sensor is arranged outside the flow chamber and has a static measurement principle based on a wave propagating in the medium.

An analysis of the prior art has shown that the applicability range of the flow control systems is restricted by either taking a nominal pressure as centre point (variable pressure loss systems and systems using the characteristic flow curve), so that the system can only operate accurately in a small pressure range around this centre point, or by the type of sensor used.

According to the invention, a flow sensor is chosen from a range of sensors which have a static measurement principle, i.e. without moving parts, which is advantageous in view of avoiding wear on the moving parts, risks of malfunction and the need for maintenance. Another advantage of a system which has a static measurement is that, for example with respect to a turbine type sensor, the pressure drop over the sensor caused by the measurement can be minimized.

According to the invention, the flow sensor has a measurement principle based on a wave propagating in the medium. The wave can be an energy or electromagnetic wave or a wave induced in the medium. Examples are:
ultrasonic flow sensors, in which ultrasonic transducers are used to induce and detect ultrasonic sound waves and thereby sensing the flow,
vortex flow sensors, in which an obstruction is placed in the flow path to induce vortices in the medium, which propagate at a speed proportional to the flow rate,
electromagnetic flow sensors, in which a magnetic field is applied to the pipe part, which results in a potential difference proportional to the flow velocity perpendicular to the flux lines. The physical principle at work is Faraday's law of electromagnetic induction.

Among these, the ultrasonic flow sensor is preferred as it can achieve a high accuracy over a wide flow range. Vortex sensors are somewhat less preferred as the measurement principle requires a minimum flow rate of the medium in order to induce the vortices and the obstruction for inducing the vortices causes a slight pressure drop. Electromagnetic sensors are also somewhat less preferred in view of restricting applicability to media with electric conductivity, although they are very suitable for sanitary applications as drinking water is conductive.

In the system of the invention, the flow sensor output is an electrical signal (analog or digital), which has the advantage of simplifying evaluation of the measured flow with the set flow, leading to a faster response time with respect to a mechanical system like the prior art system with the variable pressure loss.

In the system of the invention, the controller makes an evaluation on the level of flow, i.e. directly compares the sensed flow (the output signal of the flow sensor) with the set flow (possibly derived from a setting). This can also contribute to a faster response time with respect to prior art systems, for example prior art systems in which energy consumption is evaluated to control the medium flow.

In the system of the invention, the flow sensor is arranged outside, preferably spaced from, the flow chamber of the orifice adjusting system, so influence of the shape of the flow chamber, or other characteristics of the orifice adjusting system on the flow measurement can be avoided. As a result, the use of characteristics values, e.g. the characteristic curve of the adjustable orifice, can be avoided in controlling the orifice. Hence, the control can become truly pressure independent. Furthermore, the need for calibration of the system before use can be avoided. As a result, the flow control system can be used in combination with a wide range of different control valves or orifice adjusting systems.

An advantage of the flow control system of the present invention is that the flow control system can be used to compensate large pressure differences. The pressure difference that can be compensated is only limited to the extent by which the adjustable orifice can be opened or closed.

The orifice adjusting system is preferably constructed such that it has an equal-percentage characteristic curve, so that the adjustable orifice is more sensitive at lower flow rates than at higher flow rates. This equal-percentage characteristic curve can either be achieved by design of the shape of the parts forming the adjustable orifice or by the construction of the actuator which actuates one or more of these parts to adjust the orifice. For example, the actuator can be constructed to impart a larger relative movement in a first range starting at 0% opening of the orifice and a smaller relative movement in a second range above a given opening of the orifice. It has been found that the combination of a flow sensor of the type described above and an equal-percentage characteristic curve can lead to a highly accurate and widely applicable flow control system.

In a preferred embodiment, the flow sensor is provided in front of the flow chamber. Because the medium in front of the adjustable orifice is less disturbed by the adjustable orifice than the medium behind the adjustable orifice, the sensor can be usually positioned more closely to the adjustable orifice than is the case with a sensor positioned behind the adjustable orifice. Hence, a more compact system can be achieved.

In another preferred embodiment, the flow sensor is provided behind the flow chamber. In order to minimize disturbance of the measurement by flow turbulences caused by the adjustable orifice, the first flow measurement device is in this case preferably spaced from the adjustable orifice by at least a quieting section of predetermined length. The predetermined length depends on a number of factors, namely diameter of the pipe, pressure, flow rate etc.

The flow sensor can be positioned in front of or behind (in case of a closed system) the at least one consumer device. Positioning the flow sensor behind the at least one consumer device can result in a better longer-term performance of the sensor, because the sensor operates in a lower temperature. Moreover, by positioning the flow sensor behind the consumer device, the sensor can be used to derive the amount of delivered energy by simply combining a measurement of the temperature in the return pipe and with the (known) temperature of the medium in the supply pipe. Positioning the flow sensor in the supply pipe of the system has the advantage that disturbance of the measurements by flow turbulences caused by the consumer device can be avoided even if the flow sensor is placed close to the consumer device.

In a preferred embodiment, the sensor is an electronic sensor, more preferably an electronic flow measurement cell. Such a sensor is preferred because it can further decrease the reaction time of the flow control system.

In a preferred embodiment, the flow control system comprises a communication link towards a central unit, so that certain measured or derived values, such as for instance the actual medium flow or a calculated consumption, can be communicated at each time to the central unit. Alternatively, a decentralized reading unit associated with each consumer device can also be used to provide consumption information to the user.

The value representing the set medium flow can be input into the controller by any means considered suitable by the person skilled in the art, such as for instance through an external analogue signal, through a digital signal or through a wireless signal. The set medium flow can also be a factory preset, as well as other parameters in the controller, such as for example a maximum speed of the flowing medium.

The set medium flow can be directly inserted or communicated by the consumer to the controller. The consumer may also insert or communicate a temperature or pressure value to the controller which corresponds to the desired medium flow value. In heat exchange applications for instance, the set medium flow will usually equal the desired medium flow value needed to obtain a certain temperature in the room.

This set medium flow may be set decentralized, for each consumer/consumer device separately, or centralized, for each of the consumers/consumer devices at once.

The set medium flow corresponds to the desired medium flow and varies between 0 and 100% $V_{nom}$, wherein $V_{nom}$ is the maximum medium flow for a specific adjustable orifice. It is preferably possible to limit the range of possible medium flow values between $V_{min}$ and $V_{max}$ wherein $V_{min}$ is more than 0 and $V_{max}$ is less than $V_{nom}$.

The driving unit can be any type of driving unit known to the person skilled in the art, for instance a motor. The controller will compare the actual medium flow received from the sensor with the set medium flow, and produce a control signal. This output signal is communicated to the driving unit, which adjusts the adjustable orifice until the actual medium flow equals the set medium flow.

The flow control system according to the present invention is able to control a medium flow, but can additionally be used to determine and/or control other variables. As an example, but not being limited thereto, the flow control system can for instance be used to control the velocity of the medium flowing through the pipe part, such that it for example does not exceed a given value to avoid noise. Another example is to determine the heat delivered by the consumer device to the room, i.e. the energy use, from the actual flow measurement and an additional medium temperature measurement. This energy use may then be visualized decentralized or centralized.

The different components of the flow control system according to the present invention may form one single unit or two or more different units.

The invention will be further elucidated by means of the following description and the appended drawings.

Figure 1:
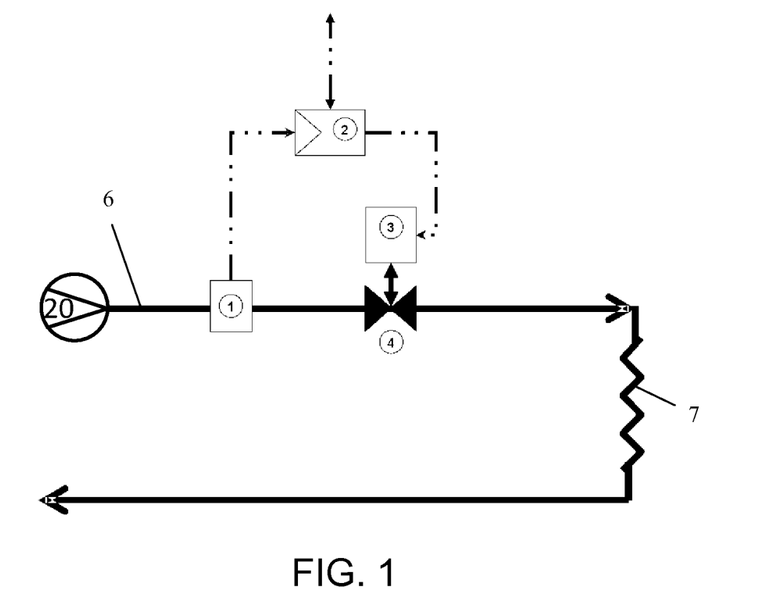
FIGS. 1-13 and 16 show detailed views of several different embodiments of the flow control system according to the present invention.
Figure 14:
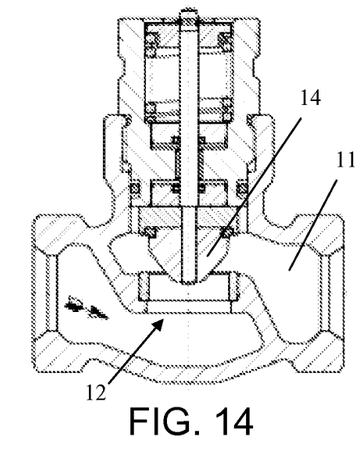
FIGS. 14 and 15 respectively show cross sections of preferred embodiments of a two-way valve and a three-way valve for use in flow control systems according to the invention.
Figure 15:
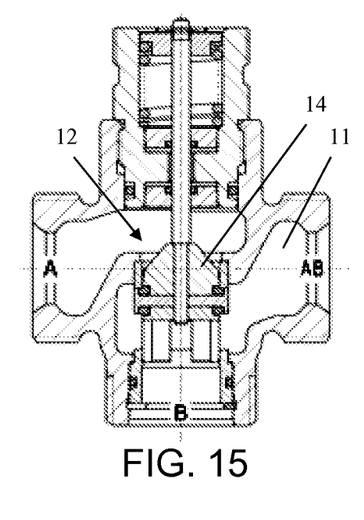

FIG. 1 shows a flow control system associated with a consumer device 7, in this case a heat exchange system, provided in a pipe part 6 of a pipe system. The pipe part 6 is part of a pipe system which is provided for distributing a medium from a common source (not shown) to a plurality of consumer devices. The flow control system comprises a flow sensor 1, a controller 2 and an orifice adjusting system 3, 4. The sensor 1 is provided for sensing an actual medium flow through the pipe part 6 and outputting an electrical signal indicative of the sensed actual medium flow. The controller 2 is in communicative connection with the flow sensor 1 and is provided for evaluating the electrical signal indicative of the sensed actual medium flow with a value representing a set medium flow and outputting a control signal based on this evaluation. The set medium flow is inputted in the controller directly or indirectly, for example by a user or a central control unit. The set medium flow can for example be derived from a desired temperature setting. The orifice adjusting system 3, 4 is in communicative connection with the controller 2 and comprises a flow chamber 11 (see FIGS. 14 and 15) with an adjustable orifice 12, by which the flow through the pipe part 6 can be adjusted. The orifice adjusting system 3, 4 is provided for adjusting the adjustable orifice 12 in response to the control signal of the controller 2. In this way, the controller can control by means of the orifice adjusting system the flow in the pipe part 6 towards the set medium flow.

Figure 2:
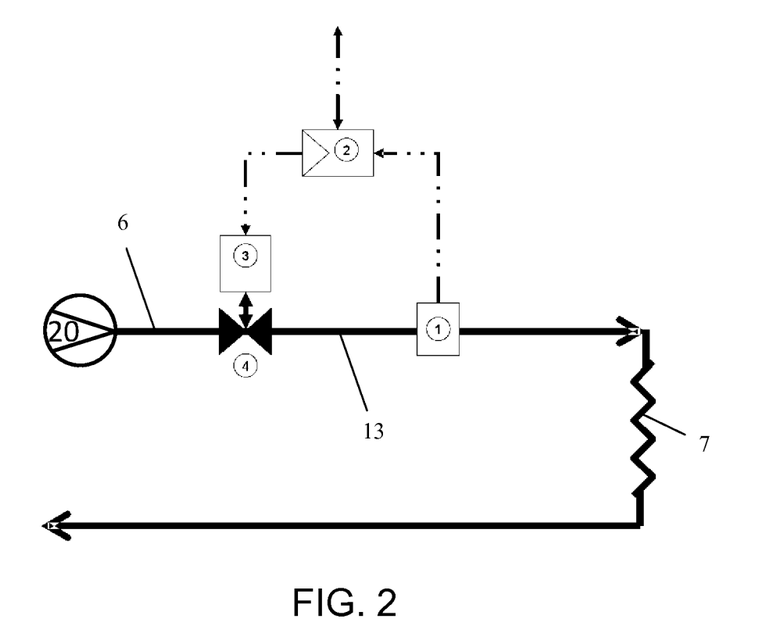

In the embodiment shown in FIG. 1, the flow sensor 1 is provided in front of the orifice adjusting system 3, 4 and in front of the heat exchange system 7 with which the flow control system is associated. Alternatively, the flow sensor 1 can also be provided behind the orifice adjusting system 3, 4 and in front of the heat exchange system 7, as is shown in FIG. 2. In this case, the flow sensor 1 is spaced from the flow chamber 11 by at least a quieting section 13 of predetermined length for attenuating turbulence in the medium caused by the adjustable orifice 12. The flow sensor can further be provided behind the heat exchange system 7 as shown in a preferred embodiment shown in FIG. 16.

Figure 16:
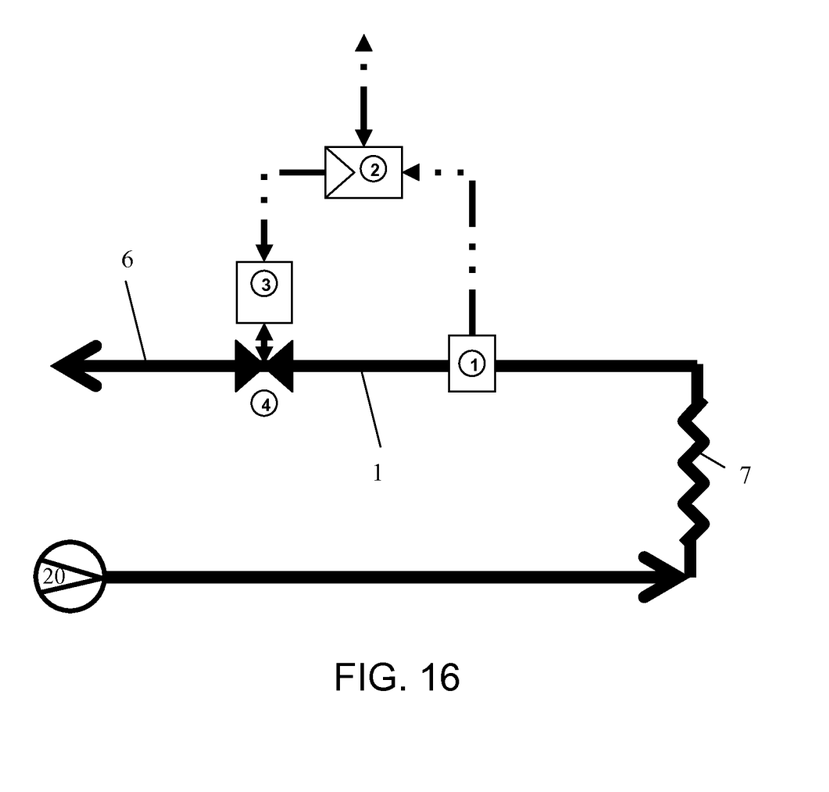

In FIGS. 1 and 2 and 16, the adjustable orifice forms part of a flow control valve 4, which together with a driving unit 3 forms the orifice adjusting system. In FIGS. 1 and 2, the flow control valve is a two-way valve. In the embodiments shown in FIGS. 3-10, which will be described below, a three-way flow control valve is used. The adjustable orifice and the driving unit may be carried out in any other way deemed suitable to the person skilled in the art.

The flow sensor 1 is a flow sensor with a static measurement principle, meaning that moving parts like for example a turbine are avoided. The static measurement principle is preferred, as it has been found that moving parts may lead to inaccurate measurements and require frequent maintenance. The measurement principle of the flow sensor 1 is not based on a moving part which is driven by the flowing medium, but on a certain wave which is induced in the flowing medium, for example ultrasonic waves by ultrasonic transducers (ultrasonic flow sensor), propagating vortices which are induced by an obstruction which is placed in the flow path (vortex sensor), electromagnetic waves by means of a magnetic field (electromagnetic flow sensor). Among these types of sensors, the ultrasonic flow sensor is preferred as it can achieve a high accuracy over a wide range.

The orifice adjusting system 3, 4 is preferably constructed such that it has an equal-percentage characteristic curve, so that the adjustable orifice is more sensitive at lower flow rates than at higher flow rates. This equal-percentage characteristic curve can either be achieved by design of shape of the movable part 14, by means of which the orifice is adjusted, or by means of the actuator in the driving unit which moves the movable member, which can for example be constructed to impart a larger movement in a first range starting at 0% opening of the orifice and a smaller movement in a second range above a given opening of the orifice. In the two-way and three-way control valves shown in FIGS. 14 and 15, the equal-percentage characteristic curve is provided by the shape of the movable parts 14.

In the preferred embodiments shown in FIGS. 3-10, the orifice adjusting system comprises a three-way control valve 4 located at an intersection of a supply pipe 15 of the pipe system, provided for supplying the medium from the common source to one of the consumer devices 7, in this case again a heat exchange system, and a bypass pipe 16 bypassing the one consumer device, such that part of the medium flow can be directly transferred to the return pipe 17 back to the common source and does not flow through the heat exchange system. As such, the three-way valve defines a first flow path for the medium from the common source via the valve to the consumer device to the return pipe, and a second flow path from the common source via the valve and the bypass pipe to the return pipe. Alternatively, the three-way valve may also be provided at the end of the bypass pipe, i.e. at the intersection between the bypass pipe and the return pipe, where the flows through the bypass pipe and the consumer device are rejoined.

Figure 3:
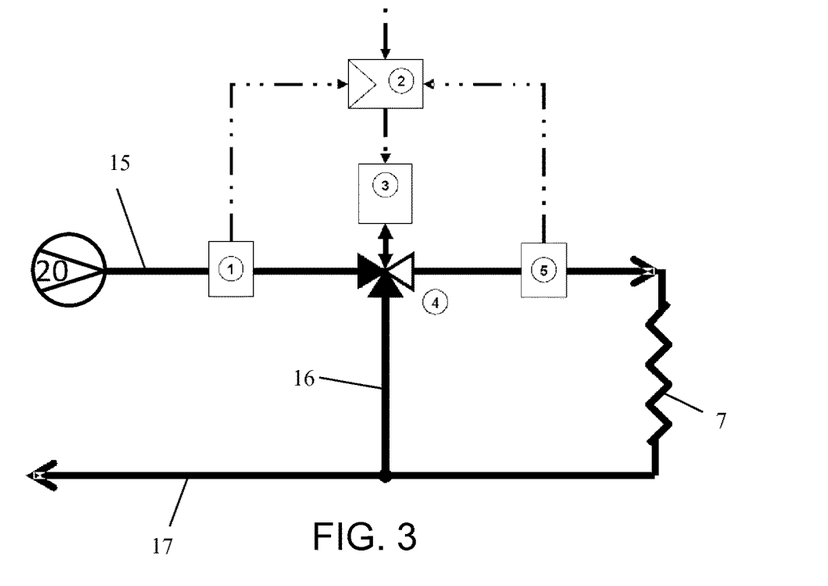

FIG. 3 shows a preferred embodiment of the flow control system comprises two flow sensors, a first flow sensor 1 in front of the three-way valve 4 and a second flow sensor 5 between the valve and the heat exchange system. The second flow sensor 5 is preferably also one with a static measurement principle based on a wave propagating in the medium, preferably of the same type as the first sensor. The first sensor measures the total flow through the supply pipe, the second sensor measures the part flowing through the heat exchange system. Both are communicatively connected to the controller 2, which controls the setting of the adjustable orifice by evaluation of the output signals of the sensors and the set medium flow.

Figure 4:
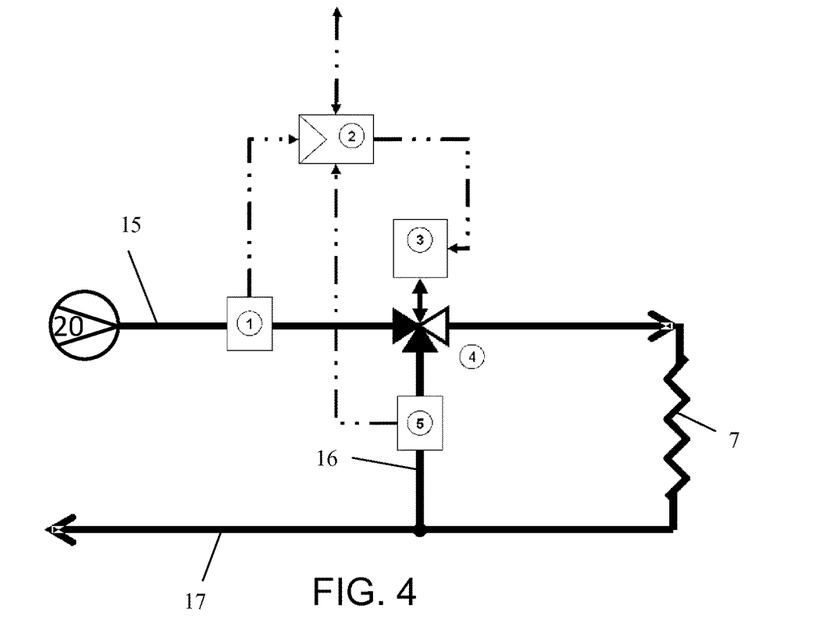

FIG. 4 shows a flow control system which is comparable to the one shown in FIG. 3, but wherein the second sensor 5 is provided along the bypass pipe.

Figure 5:
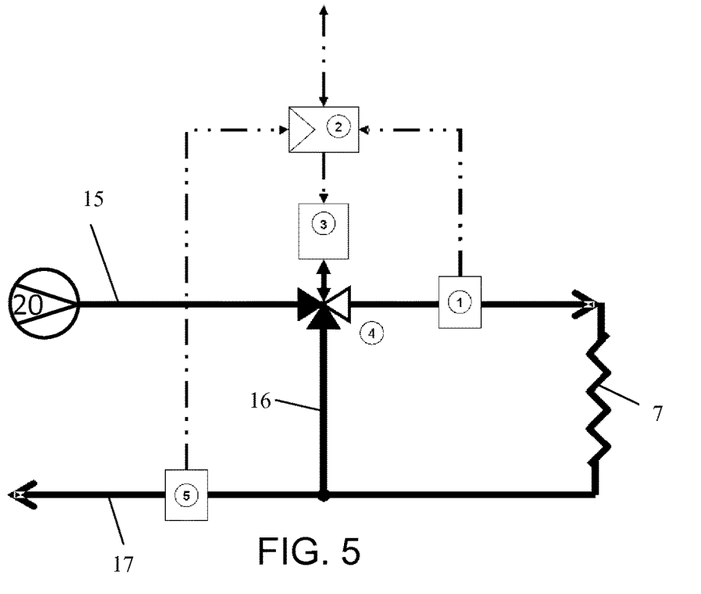

FIG. 5 shows a flow control system which is comparable to the one shown in FIG. 3, but wherein the first flow sensor 1 is provided along the return pipe at a position behind the intersection point between the bypass pipe and the return pipe.

Figure 6:
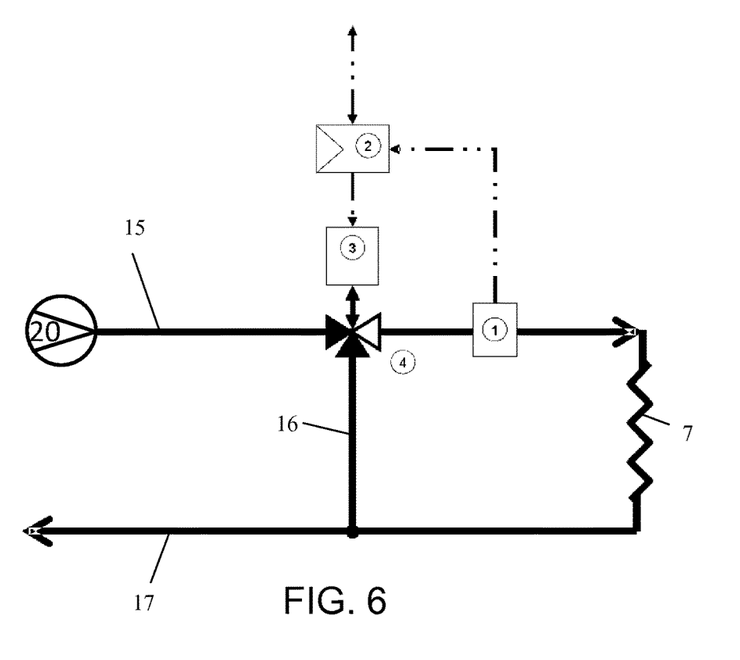

FIG. 6 shows a flow control system comprising a three-way control valve, with only one flow sensor 1 between the valve 4 and the consumer device 7. Here, the system may comprise an additional application, wherein the flow control system is used to influence, software-wise, the characteristic curve of the three-way control valve. Such a system may for instance be used to change a linear characteristic curve of the adjustable orifice in a non-linear characteristic curve or vice versa. This software-like correction of the characteristic curve can also be used in the systems shown in FIGS. 1-2, wherein a two-way valve is used.

Figure 7:
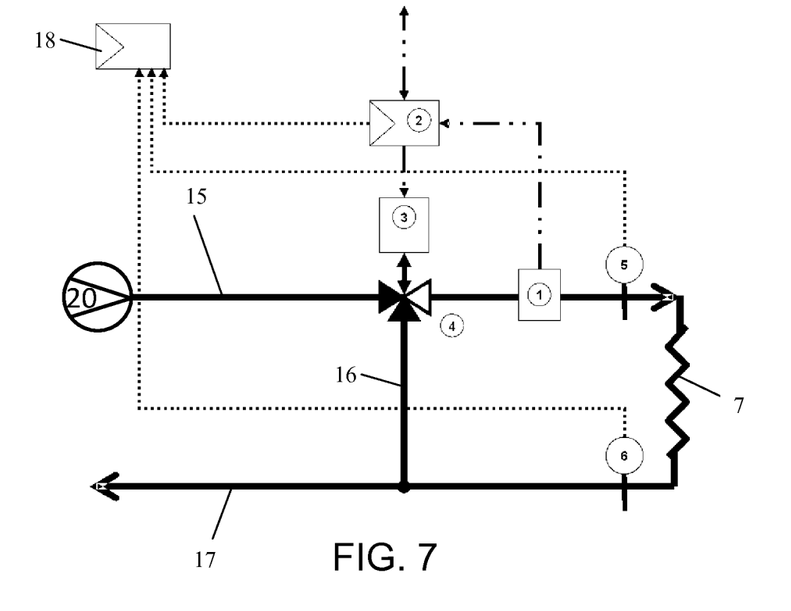

FIG. 7 shows another application of the flow control system according to the present invention. The flow control system shown in FIG. 7 comprises flow sensor 1 along the supply pipe in a position between the three-way valve 4 and the heat exchange system 7. The flow control system further comprises a first and a second temperature sensor 5, 6 for measuring the temperature of the medium at the entrance and the exit of the consumer device. These three measurements, i.e. the actual medium flow, the entrance and exit temperature, may then be transferred to a central unit 18, which is able to calculate the amount of energy exchanged by the heat exchange system.

Figure 8:
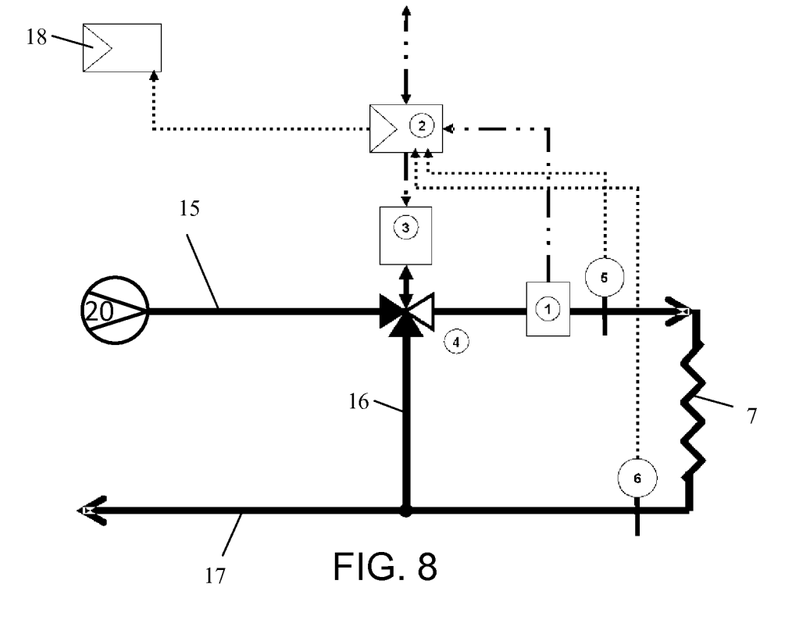

FIG. 8 shows a flow control system similar to that of FIG. 7, but wherein the temperature measurements and the actual medium flow are first being transferred to the controller 2, which then derives the amount of energy exchanged by the consumer device. This value may then be transferred to a central reading unit 18.

Figure 9:
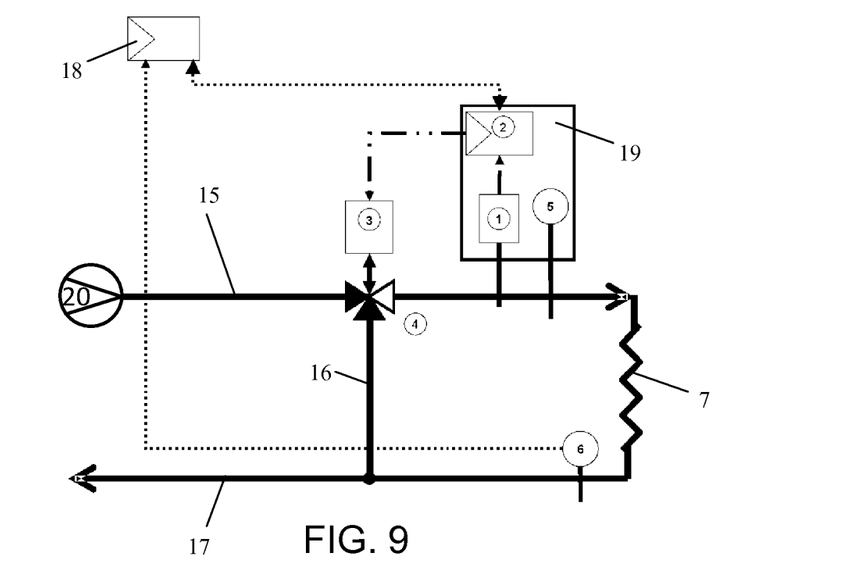

FIG. 9 shows a flow control system similar to that of FIG. 7 or 8, wherein the flow sensor, the first temperature sensor and the controller are located at the entrance of the heat exchange system 7 and integrated into one and the same unit 19. Here, the central unit 18 communicates a desired temperature setting to the controller 2 of the unit 19, which determines the set medium flow from this desired temperature setting and the measurement of the first temperature sensor 5. The flow sensor 1 provides feedback if the actual medium flow corresponds to the set medium flow. The second temperature sensor provided at the exit of the consumer device communicates the exit temperature to the central unit 18.

Figure 10:
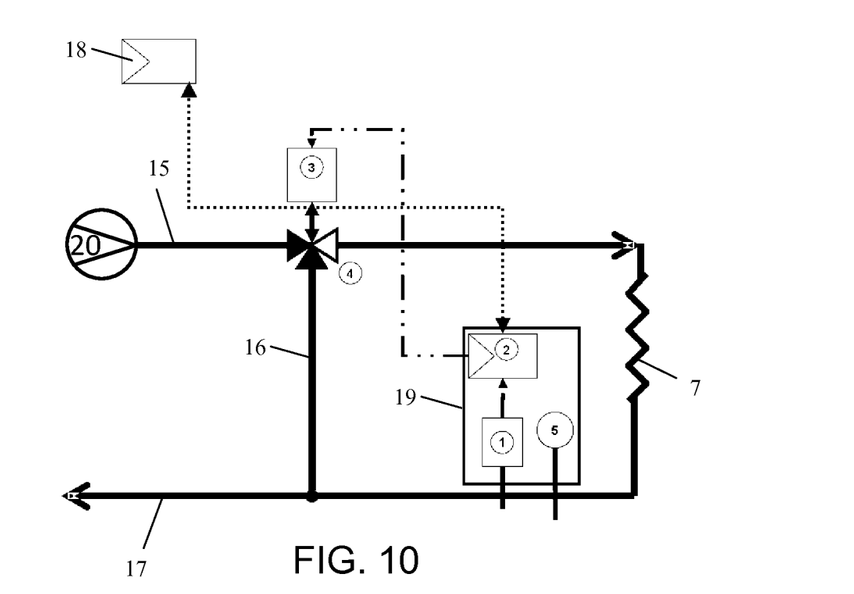

FIG. 10 shows a flow control system similar to that of FIG. 9, but wherein the integrated unit 19, comprising the flow sensor 1, the first temperature sensor 5 and the controller 2, is located along the return pipe 17 in a position behind the heat exchange system 7 and in front of the bypass pipe 16.

Figure 11:
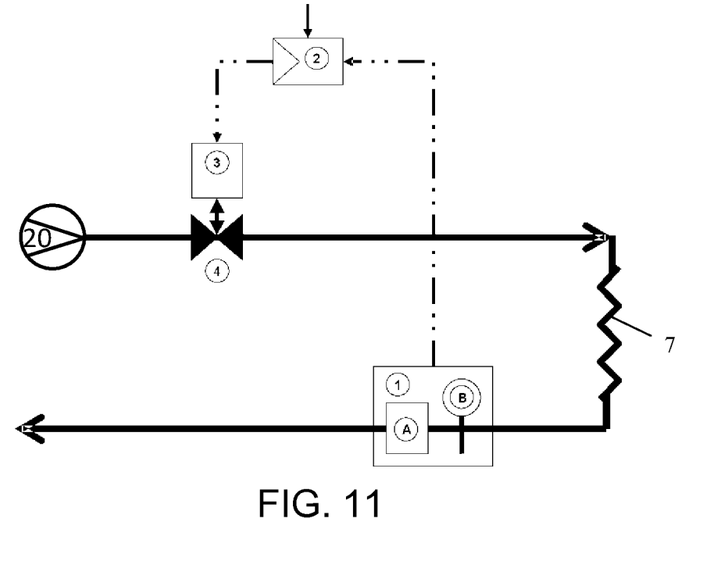

FIG. 11, shows a flow control system wherein the flow sensor 1 comprises a combined flow measurement device (part A) and a temperature sensor (part B). Assuming that the temperature of the medium along the supply pipe remains substantially constant, a measurement of the temperature at the exit side of the heat exchange system allows determining the amount of energy exchanged by the heat exchange system. The exchanged amount of energy can be cooling, i.e. intake of energy by the consumer device, or heating, i.e. return of energy by the consumer device.

Figure 12:
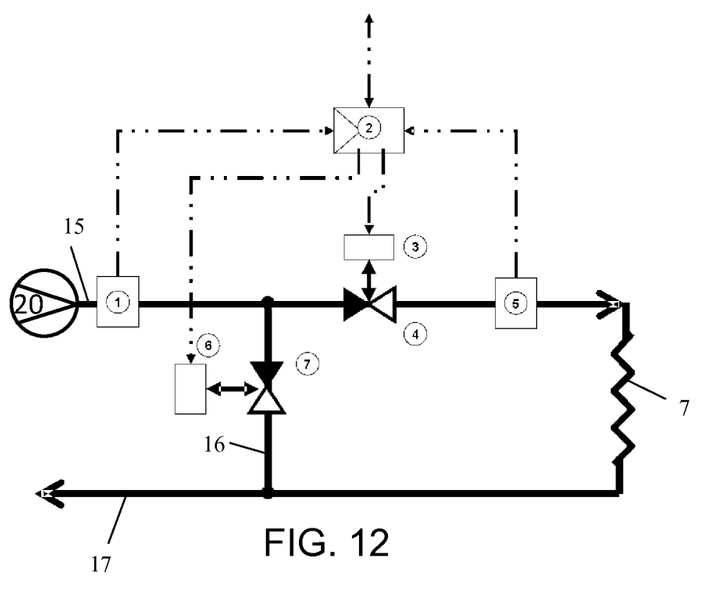

FIG. 12 shows a flow control system similar to that of FIG. 3, wherein two two-way control valves 4, 7 replace the three-way control valve. The two two-way valves shown in FIG. 12 are each controlled by a separate driving unit 3, 8, which are controlled by a common controller 2.

Figure 13:
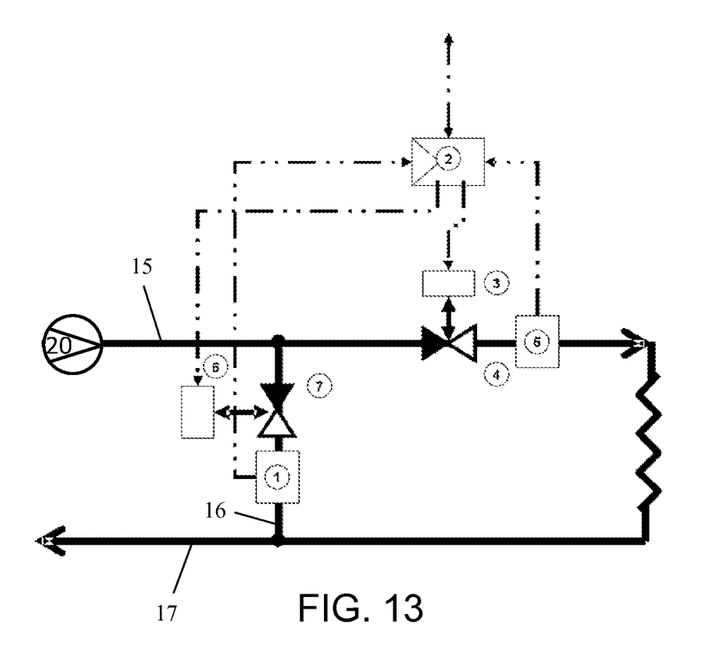

FIG. 13 shows a flow control system similar to that of FIG. 12, wherein the first flow sensor is moved from the supply pipe 15 to the bypass pipe 16, after the two-way valve 7.

The different components of the flow control system are shown as separate components in FIGS. 1-13. However, it is possible that one or more of the components are integrated in one and the same housing. It is for instance possible to integrate the controller and the driving unit or the driving unit and the orifice adjusting system or any other combination considered suitable by the person skilled in the art.

The flow control system according to the present invention, embodiments of which are shown in FIGS. 1-13 can also be used in a number of different applications.

As an example, but not being limited thereto, the flow control system of the present invention can be used in a central heating system to individually control the medium flow through a number of heat exchangers, for example to compensate for pressure variations in the various pipes. An advantage of the flow control system of the invention is that the same flow control system can be applied throughout the central heating system, without need for calibration.

The flow control system can also be used in sanitary applications, wherein water is distributed from a common source to a plurality of taps. The flow control system can be used to control the water flow to and through the taps in such a way that it is not dependent on pressure variations. When closing one or more taps, the pressure of the water passing through the pipe system at the position of the other taps, will increase. As a result, the actual water flow measured by the sensor of the flow control system will increase, as a result of which a difference between the actual medium flow and the set medium flow is detected. This results in a control signal communicated by the controller to the orifice adjusting system of the flow control system, as a result of which the adjustable orifice of the corresponding water tap will be closed to a certain extent until the actual medium flow meets the set medium flow.

Another way of using the flow control system in sanitary applications is by using it to regulate the water hygiene by controlling the flushing process. When a tap is not used for a certain period of time, contamination can build up in the tap and the adjacent pipe part of the pipe system, which is of course not desired. It is known to provide the orifice adjusting system of a tap with a timer and to distribute the water on regular intervals through the pipe system in order to avoid contamination build up inside the pipe system and the tap. However, the current flushing processes do not provide in an accurate and normalized flushing process, since the amount of water used for the flushing process is dependent on the actual pressure of the water. The flow control system of the present invention can be used to normalize the amount of water used during the flushing process by controlling the water flow of the water during the flushing process to a set water flow. This can be understood as follows. Preferably, the flow control system is provided with a timer which monitors at each time the water circulation through a certain part of the pipe system. From the moment there is no or insufficient consumption of water at that pipe part, the flow control system will open the adjustable orifice and flush that specific pipe part. The amount of water used by the flushing process is measured and limited by the flow control system. Preferably, not only the flow of the flushing water is controlled, but also the temperature of the flushing water is controlled. By controlling the temperature and flow of the flushing water, the flow control system is able to provide in an effective and normalized flushing process.

The controllers 2 of the various embodiments described above can be provided with wireless telecommunication means for communicating wirelessly with a remote control unit, by means of which a user can for example adjust a desired temperature setting in the controller, or directly a set medium flow, or read out data stored in the controller such as for example water or energy consumption in the associated consumer device.

The invention claimed is:

1. A central heating/cooling system and/or sanitary system, comprising:
a liquid medium;
a common source provided for delivering the liquid medium;
a plurality of consumer devices connected to the common source through a pipe system via which the liquid medium is distributed, wherein the consumer devices comprise heat exchange systems, water taps, or heat exchange systems and water taps;
at least one flow control system associated with at least one of the plurality of consumer devices and provided for controlling a flow of the liquid medium passing through a pipe part of the pipe system and thereby controlling the flow of the liquid medium towards the associated at least one consumer device, the flow control system comprising:
a flow sensor for sensing an actual medium flow through the pipe part and outputting an electrical signal indicative of the sensed actual medium flow;
a flow controller in communicative connection with the flow sensor and outputting a control signal; and
an orifice adjusting system in communicative connection with the flow controller, the orifice adjusting system comprising a flow chamber with an adjustable orifice in the pipe part, the orifice adjusting system being provided for adjusting the adjustable orifice in response to the control signal of the flow controller, the orifice adjusting system having a characteristic curve,
wherein the flow sensor is arranged outside the flow chamber and has a static measurement principle based on a wave propagating in the liquid,
wherein the flow controller has as input a value representing a medium flow rate set point, and wherein the flow controller is provided for evaluating the electrical signal indicative of the sensed actual medium flow with the value representing the medium flow rate set point and outputting the control signal based on said evaluation, and
the flow control system is arranged to provide a real-time software-wise correction of the characteristic curve of the orifice adjusting system to compensate for pressure variations.

2. The central heating/cooling system and/or sanitary system according to claim 1, wherein the flow sensor is chosen from the group consisting of: ultrasonic flow sensor, vortex flow sensor, electromagnetic flow sensor.

3. The central heating/cooling system and/or sanitary system according claim 1, wherein the sensor is provided in said pipe part in a position in front of the orifice adjusting system.

4. The central heating/cooling system and/or sanitary system according to claim 1, wherein the sensor is provided in said pipe part in a position behind the orifice adjusting system, spaced by at least a quieting section for attenuating turbulence in the medium caused by the orifice adjusting system.

5. The central heating/cooling system and/or sanitary system according to claim 1, wherein the orifice adjusting system comprises a two-way valve.

6. The central heating/cooling system and/or sanitary system according to claim 1, wherein the orifice adjusting system comprises a three-way valve located at an intersection of a supply pipe of the pipe system, provided for supplying the medium from the common source to at least one of the consumer devices, and a bypass pipe bypassing the at least one consumer device.

7. The central heating/cooling system and/or sanitary system according to claim 6, wherein the system further comprises a second sensor for sensing a second actual medium flow from the three-way valve to the consumer device and outputting a second electrical signal indicative of the second actual medium flow, the flow controller being in communicative connection with the second flow sensor and being provided for also evaluating the second electrical signal.

8. The central heating/cooling system and/or sanitary system according to claim 7, wherein the first flow sensor is provided along a return pipe rejoining the flow through the bypass pipe and the flow through the at least one consumer device.

9. The central heating/cooling system and/or sanitary system according to claim 6, wherein the system further comprises a second sensor for sensing a second actual medium flow through the bypass pipe and outputting a second electrical signal indicative of the second actual medium flow, the flow controller being in communicative connection with the second flow sensor and being provided for also evaluating the second electrical signal.

10. The central heating/cooling system and/or sanitary system according to claim 9, wherein the first flow sensor is provided along a return pipe rejoining the flow through the bypass pipe and the flow through the at least one consumer device.

11. The central heating/cooling system and/or sanitary system according to claim 6, wherein the flow sensor is provided between the three-way control valve and the consumer device.

12. The central heating/cooling system and/or sanitary system according to claim 1, wherein the flow control system further comprises a first temperature sensor provided along the pipe system in a position in front of the consumer device and provided for measuring a supply temperature of the medium entering the consumer device.

13. The central heating/cooling system and/or sanitary system according to claim 1, wherein the flow control system comprises a second temperature sensor provided along the pipe system behind the consumer device and provided for measuring an exit temperature of the medium leaving the consumer device.

14. The central heating/cooling system and/or sanitary system according to claim 1, wherein the flow control system further comprises a first pressure measurement device provided along the pipe system in a position in front of the consumer device and provided for measuring a first pressure of the medium entering the consumer device.

15. The central heating/cooling system and/or sanitary system according to claim 1, wherein the flow control system comprises a second pressure measurement device provided along the pipe system in a position behind the consumer device and for measuring a second pressure of the medium leaving the consumer device.

16. The central heating/cooling system and/or sanitary system according to claim 1, wherein said flow sensor is an electronic device outputting a digital value indicative of the actual medium flow.

17. The central heating/cooling system and/or sanitary system according to claim 1, wherein said flow control system further comprises a communication link towards a central unit.

18. The central heating/cooling system and/or sanitary system according to claim 1, wherein the control system is provided for calculating consumption of the consumer device.

19. The central heating/cooling system and/or sanitary system according to claim 1, wherein the orifice adjusting system comprises a driving unit, which is in communicative connection with the flow controller and which is provided for driving a movable part to adjust the adjustable orifice.

20. A method for using the sanitary system according to claim 1, comprising the step of operating the flow control system for periodically flushing said pipe part.

21. The central heating/cooling system and/or sanitary system according to claim 1, wherein the orifice adjusting system has an equal-percentage characteristic curve.

22. The central heating/cooling system and/or sanitary system according to claim 1, wherein the flow controller is provided for making an evaluation on the level of flow by directly comparing the electrical signal indicative of the sensed actual medium flow with the value representing the medium flow rate set point and outputting the control signal based on said evaluation.

23. The central heating/cooling system and/or sanitary system according to claim 1, wherein the flow sensor is arranged spaced from the flow chamber of the orifice adjusting system, such that influence of the shape of the flow chamber, or other characteristics of the orifice adjusting system on the flow measurement are avoided.

24. The central heating/cooling system and/or sanitary system according to claim 1, wherein the flow sensor is arranged spaced from the flow chamber of the orifice adjusting system, such that influence of the shape of the flow chamber, or other characteristics of the orifice adjusting system on the flow measurement are avoided and that the flow control system is provided for pressure independent control of the flow of the medium passing through said pipe part.

25. A central heating/cooling system and/or sanitary system, comprising:
a liquid medium;
a common source provided for delivering the liquid medium;
a plurality of consumer devices connected to the common source through a pipe system via which the liquid medium is distributed, wherein the consumer devices comprise heat exchange systems, water taps, or heat exchange systems and water taps;
a plurality of flow control systems, each being associated with a group of at least one of the plurality of consumer devices and being provided for individually controlling a flow of the liquid medium passing through a pipe part of the pipe system and the associated group of consumer devices, each flow control system comprising:
a flow sensor for sensing an actual medium flow through the pipe part and outputting an electrical signal indicative of the sensed actual medium flow; wherein the flow sensor is arranged outside a flow chamber and has a static measurement principle based on a wave propagating in the liquid medium;
a flow controller in communicative connection with the flow sensor and outputting a control signal, wherein the flow controller has an input value representing a medium flow rate set point, and wherein the flow controller is provided for evaluating the electrical signal indicative of the sensed actual medium flow with the value representing the medium flow rate set point and outputting the control signal based on said evaluation; and an orifice adjusting system in communicative connection with the flow controller, the orifice adjusting system comprising the flow chamber with an adjustable orifice in the pipe part, the orifice adjusting system being provided for adjusting the adjustable orifice in response to the control signal based on said evaluation and thereby controlling the flow in the pipe part until the actual medium flow equals the medium flow rate set point, the orifice adjusting system having a characteristic curve, and the flow control systems arranged to provide a real-time software-wise correction of the characteristic curve of the orifice in the adjusting system to compensate for pressure variations.

26. The central heating/cooling system and/or sanitary system according to claim 25, wherein the flow controller is provided for making an evaluation on the level of flow by directly comparing the electrical signal indicative of the sensed actual medium flow with the value representing the medium flow rate set point and outputting the control signal based on said evaluation.

27. The central heating/cooling system and/or sanitary system according to claim 25, wherein the flow sensor is arranged spaced from the flow chamber of the orifice adjusting system, such that influence of the shape of the flow chamber, or other characteristics of the orifice adjusting system on the flow measurement are avoided.

28. The central heating/cooling system and/or sanitary system according to claim 25, wherein the flow sensor is arranged spaced from the flow chamber of the orifice adjusting system, such that influence of the shape of the flow chamber, or other characteristics of the orifice adjusting system on the flow measurement are avoided and that the flow control system is provided for pressure independent control of the flow of the medium passing through said pipe part.

29. The central heating/cooling system and/or sanitary system according to claim 25, wherein the flow sensor is arranged spaced from the flow chamber of the orifice adjusting system, such that influence of the shape of the flow chamber and other characteristics of the orifice adjusting system on the flow measurement is avoided, and wherein the orifice adjusting system has an equal-percentage characteristic curve.

30. The central heating/cooling system and/or sanitary system according to claim 25, wherein the flow sensor is an ultrasonic flow sensor.

* * * * *